United States Patent [19]
Sobue et al.

[11] Patent Number: 6,143,450
[45] Date of Patent: Nov. 7, 2000

[54] COLOR FILTER SUBSTRATE MANUFACTURING METHOD, COLOR FILTER SUBSTRATE MANUFACTURED BY THIS MANUFACTURING METHOD, AND LIQUID CRYSTAL ELEMENT USING THIS COLOR FILTER SUBSTRATE

[75] Inventors: Masashi Sobue, Yokohama; Hideaki Takao, Machida; Ryuichi Yokoyama, Yokohama; Shoji Shiba, Sagamihara; Takeshi Okada, Kawasaki, all of Japan

[73] Assignee: Canon Kabushiki Kaisha, Tokyo, Japan

[21] Appl. No.: 09/145,981

[22] Filed: Sep. 3, 1998

[30] Foreign Application Priority Data

Sep. 5, 1997 [JP] Japan ..................................... 9-240536

[51] Int. Cl.[7] ............................. G02B 5/20; G02F 1/1335
[52] U.S. Cl. ................................. 430/7; 347/106; 349/106
[58] Field of Search ................................ 430/7; 349/106; 347/106

[56] References Cited

U.S. PATENT DOCUMENTS 5,716,740  2/1998  Shiba et al. .................................. 430/7

FOREIGN PATENT DOCUMENTS

| | | |
|---|---|---|
| 0 675 384 | 10/1995 | European Pat. Off. . |
| 0 675 385 | 10/1995 | European Pat. Off. . |
| 0 738 905 | 10/1996 | European Pat. Off. . |
| 0 775 587 | 5/1997 | European Pat. Off. . |
| 59-75205 | 4/1984 | Japan . |
| 63-235901 | 9/1988 | Japan . |
| 63-294503 | 12/1988 | Japan . |
| 1-217302 | 9/1989 | Japan . |
| 8-086913 | 4/1996 | Japan . |
| 8-327996 | 12/1996 | Japan . |
| WO 97/02955 | 1/1997 | WIPO . |

*Primary Examiner*—John A. McPherson
*Attorney, Agent, or Firm*—Fitzpatrick, Cella, Harper & Scinto

[57] ABSTRACT

A color filter substrate manufacturing method includes the steps of forming a black matrix having a plurality of first apertures of the same shape on a support substrate, forming a color filter by an ink jet system, and forming an alignment mark within an effective display region. The alignment mark includes a second aperture different in shape from the first apertures of the black matrix and is used to form the color filter.

8 Claims, 9 Drawing Sheets

COLOR FILTER SUBSTRATE MANUFACTURING METHOD, COLOR FILTER SUBSTRATE MANUFACTURED BY THIS MANUFACTURING METHOD, AND LIQUID CRYSTAL ELEMENT USING THIS COLOR FILTER SUBSTRATE

BACKGROUND OF THE INVENTION

1. Field of the Invention

The present invention relates to a color filter substrate manufacturing method and color filter substrate used for color display devices and, more particularly, to a color filter substrate manufacturing method and color filter substrate suitable for color liquid crystal display devices used for color televisions, car televisions, personal computers and the like, and a liquid crystal element using the color filter substrate.

2. Related Background Art

With recent development of personal computers, especially portable personal computers, demand has arisen for liquid crystal displays, especially color liquid crystal displays. However, in order to further popularize the use of liquid crystal displays, a reduction in cost must be achieved. Especially, it is required to reduce the cost of a color filter. Various methods have been tried to satisfy the required characteristics of color filters while meeting the above requirements. However, any method capable of satisfying all the requirements has not been established. The respective methods will be described below.

The first method is a pigment dispersion method. In this method, a pigment-dispersed photosensitive resin layer is formed on a substrate and patterned into a single-color pattern. This process is repeated three times to obtain R, G, and B color filter layers.

The second method is a dyeing method. In the dyeing method, a glass substrate is coated with a water-soluble polymer material as a dyeable material, and the coating is patterned into a desired shape by a photolithography process. The obtained pattern is dipped in a dye bath to obtain a colored pattern. This process is repeated three times to form R, G, and B color filter layers.

The third method is an electrodeposition method. In this method, a transparent electrode is patterned on a substrate, and the resultant structure is dipped in an electrodeposition coating fluid containing a pigment, a resin, an electrolyte, and the like to be colored in the first color by electrodeposition. This process is repeated three times to form R, G, and B color filter layers. Finally, these layers are thermally cured.

The fourth method is a printing method. In this method, a pigment is dispersed in a thermosetting resin, and a printing operation is repeated three times to form R, G, and B coatings separately. Colored layers are then formed by thermosetting the resins.

In each of the above methods, a protective layer is generally formed on the colored layers.

The point common to these methods is that the same process must be repeated three times to obtain layers colored in three colors, i.e., R, G, and B. This causes an increase in cost. In addition, as the number of processes increases, the yield decreases. In the electrodeposition method, limitations are imposed on pattern shapes which can be formed. For this reason, with the existing techniques, this method cannot be applied to TFT color liquid displays. In the print method, a pattern with a fine pitch cannot be formed because of poor resolution and poor evenness.

In order to eliminate these drawbacks, methods of manufacturing color filters by an ink-jet system are disclosed in Japanese Laid-Open Patent Application Nos. 59-75205, 63-235901, 63-294503, and 1-217302.

In Japanese Laid-Open Patent Application No. 1-217302, upon exposing an ink receptive layer to a pattern, an alignment mark is formed in a region outside the effective display region and used for alignment of a coloring ink to be applied.

In this manner, in the color filter manufacturing method by an ink-jet system, the alignment mark formed in a region outside the effective display region is used for drawing alignment by the ink-jet head. Accordingly, the distance between the alignment mark and the nozzle position of the ink-jet head is long, and drawing often shifts.

In many cases, the color filter is distorted outside the effective display region, i.e., near the edge of the color filter. A large distortion obstructs proper alignment.

In order to form the alignment mark, a margin must be ensured outside the effective display region. This reduces the effective display region for displaying an image with respect to the size of the color filter substrate, and thus the substrate cannot be effectively used. Further, when a liquid crystal element is constituted using such a color filter substrate, the positional relationship with the alignment mark of a counter array substrate must be considered. This limitation complicates the design.

SUMMARY OF THE INVENTION

The present invention has been made to solve the above problems, and has as its object to provide a color filter substrate manufacturing method capable of applying a coloring ink with high precision under high-precision alignment and manufacturing a color filter with high reliability without color mixing and color omission, a color filter substrate manufactured by this manufacturing method, and a liquid crystal element.

According to the present invention, there is provided a color filter substrate manufacturing method comprising the steps of forming a black matrix on a support substrate, and forming a color filter by an ink-jet system, wherein an alignment mark is formed within an effective display region, and drawing alignment is performed using the alignment mark in forming the color filter.

According to the present invention, there is also provided a color filter substrate manufactured by the manufacturing method. According to the present invention, there is further provided a liquid crystal element constituted by the color substrate.

DETAILED DESCRIPTION OF THE PREFERRED EMBODIMENTS

In the present invention, an alignment mark is formed in an effective display region and used for alignment in forming a color filter.

Figure 1A:
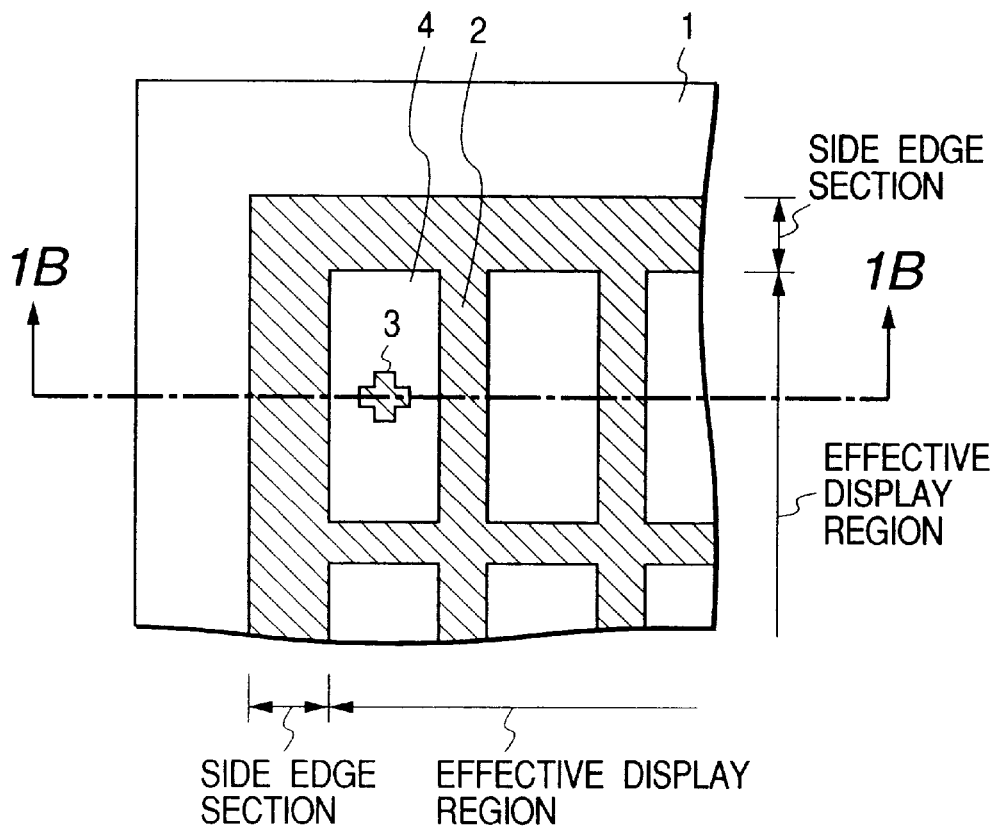
FIGS. 1A and 1B are a plan view and a sectional view, respectively, showing an embodiment of a color filter substrate according to the present invention.
Figure 1B:
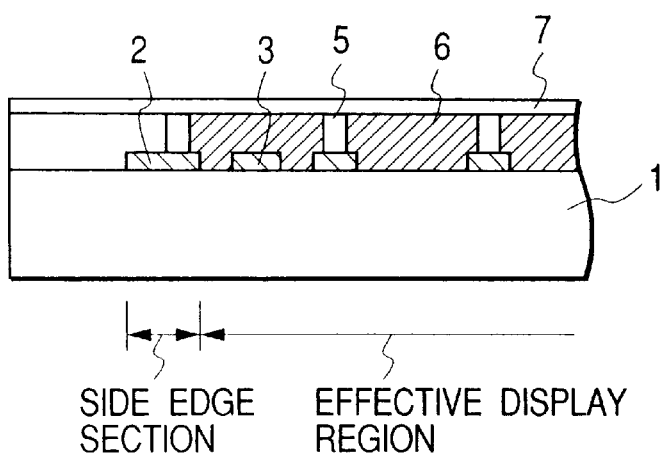

In FIG. 1A, a color filter substrate comprises a substrate 1, a black matrix 2, an alignment mark 3, and opening portions 4 of the black matrix 2. FIG. 1B is a schematic sectional view taken along the line 1B—1B in FIG. 1A. A color filter is made up of non-colored portions 5 and colored portions 6, and covered with a protective layer 7, if necessary. In FIG. 1A, the color filter and the protective layer on it are not illustrated.

In the present invention, as shown in FIG. 1A, the side edge section of the black matrix is a frame-like light-shielding region around the effective display region, and the effective display region is a portion surrounded by the side edge section and used to display an image.

Figure 6:
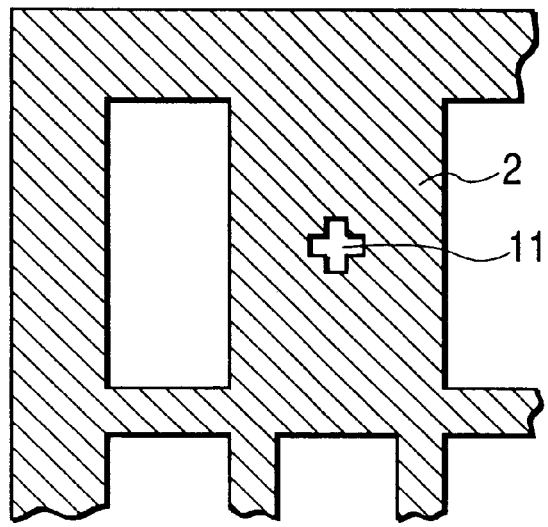
FIG. 6 is a plan view showing an example of a black matrix pattern according to the present invention.
Figure 7:
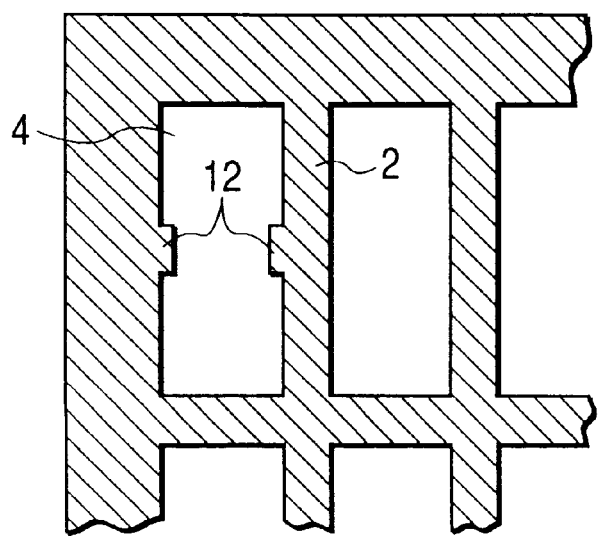
FIG. 7 is a plan view showing another example of the black matrix pattern according to the present invention.
Figure 8:
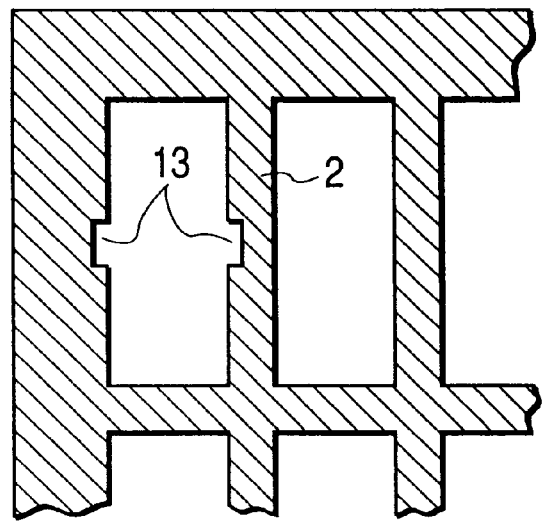
FIG. 8 is a plan view showing still another example of the black matrix pattern according to the present invention.
Figure 9:
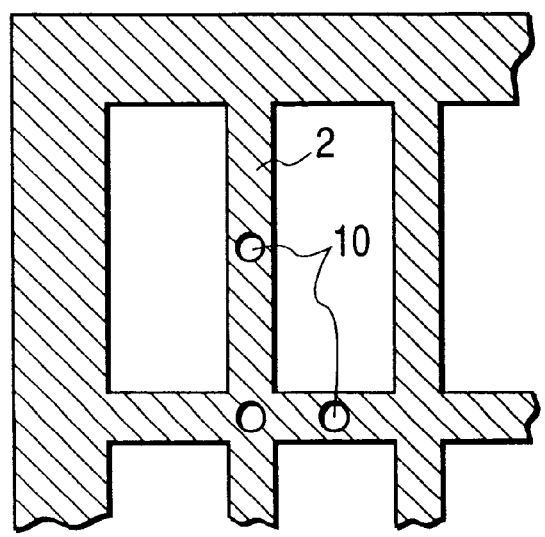
FIG. 9 is a plan view showing still another example of the black matrix pattern according to the present invention.
Figure 10:
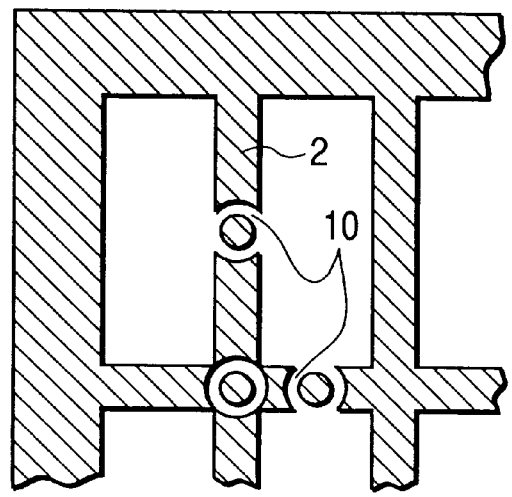
FIG. 10 is a plan view showing still another example of the black matrix pattern according to the present invention.
Figure 11:
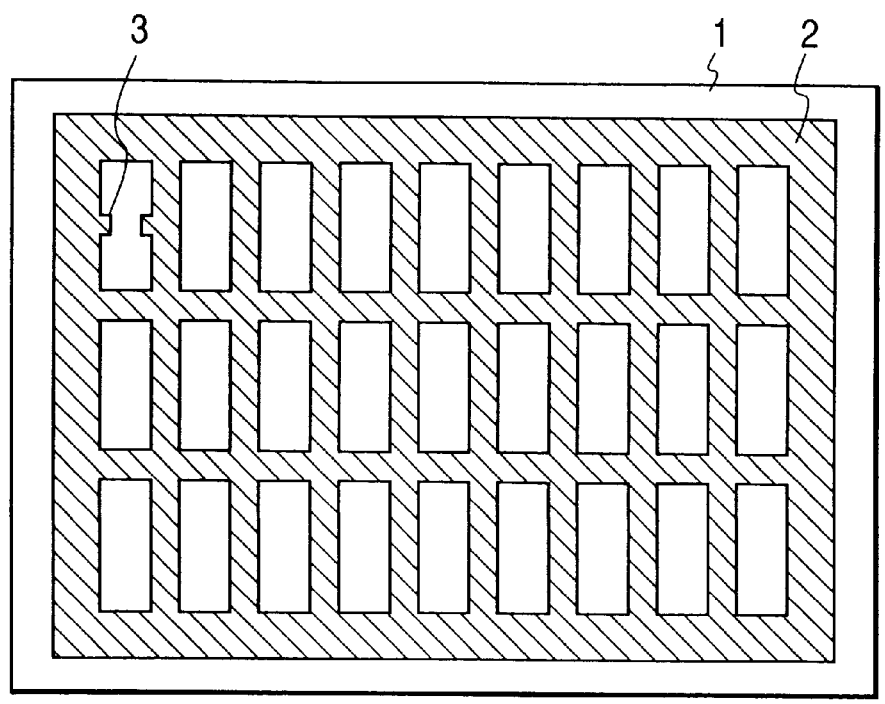
FIG. 11 is a plan view showing an example of the entire black matrix pattern of the color filter substrate according to the present invention.

In the present invention, examples of the alignment mark are an alignment mark formed from the same material as the black matrix 2 in the opening portion 4, as shown in FIGS. 1A and 1B, and a light-transmitting portion 10 formed in the black matrix 2, as shown in FIGS. 9 and 10. Other examples of the alignment mark are a light-transmitting portion 11 formed in the black matrix 2, as shown in FIG. 6, a projection 12 formed on the side wall of the opening portion 4, as shown in FIG. 7, a recess 13 formed in the side wall of the opening portion 4, as shown in FIG. 8, and a combination of them.

The alignment mark is desirably formed in an opening portion 4 at the corner of the effective display region so as not to adversely affect the display of an image.

When the alignment mark is formed in the opening portion 4, the size of the alignment mark is preferably 1/10 to 1/3, and more preferably 1/8 to 1/3 the area of the opening portion 4 where the alignment mark 3 is formed.

FIGS. 2A to 2F show an embodiment of a color filter substrate manufacturing method according to the present invention. In this embodiment, an alignment mark having a pattern shown in FIG. 1A is formed. FIGS. 2A to 2F are schematic sectional views corresponding to the following step-a to step-f, respectively.

Step-a

A black matrix 2 and an alignment mark 3 are simultaneously formed on a substrate 1 by photolithography. As the substrate 1, a glass substrate is generally used, but may be a plastic substrate as far as the substrate has characteristics, such as the strength, required for the application purpose of the color filter substrate without impairing the transparency of the color filter. When a reflection liquid crystal element is to be formed, an opaque substrate may be used as the substrate 1. When a liquid crystal element is to be formed, the black matrix 2 is generally obtained by forming a metal film such as a chromium film about 0.1 to 0.5 µm in thickness by sputtering, deposition, or the like, and patterning the film into a predetermined shape.

Step-b

An ink receptive layer 21 is formed on the substrate 1. The ink receptive layer 21 is made of an ink absorptive resin composition, e.g., a resin composition which exhibits or loses ink absorption by light irradiation and/or heating. In the resin composition which exhibits ink absorption by light irradiation and/or heating, the ink absorption is attained by exposing the ink receptive layer 21 in advance. It is preferable to use a resin composition which exhibits or loses ink absorption by light irradiation, to form exposed and unexposed portions by pattern exposure in step-c (to be described below), and to selectively color only an ink absorptive region.

As the resin composition used for the ink receptive layer 21, an acrylic resin, an epoxy resin, an amido resin, a phenolic resin, or a polystyrene resin is used together with an optical initiator (crosslinker) if necessary.

The resin composition is applied on the substrate 1 by, e.g., spin coating, roller coating, bar coating, spray coating, or dipping, and is pre-baked, as needed, to form the ink receptive layer 21.

The ink receptive layer 21 has a thickness of about 0.4 to 2.0 µm when a liquid crystal element is to be formed.

Step-c

The ink receptive layer 21 is exposed to a pattern using a photomask 22 to form non-colored portions 5 having no ink absorption. The ink receptive layer 21 in FIGS. 2A to 2F has ink absorption which disappears by exposure. If a resin composition which exhibits ink absorption by exposure is used, the ink receptive layer 21 is exposed to a reverse pattern.

Figure 2A:
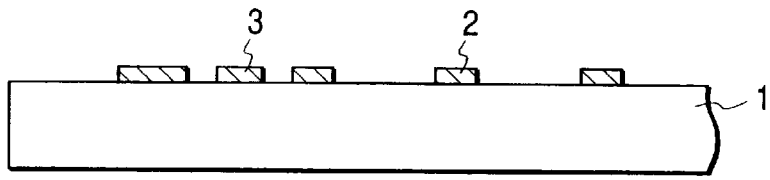
FIGS. 2A, 2B, 2C, 2D, 2E and 2F are sectional views, respectively, showing an embodiment of a color filter substrate manufacturing method according to the present invention.
Figure 2B:
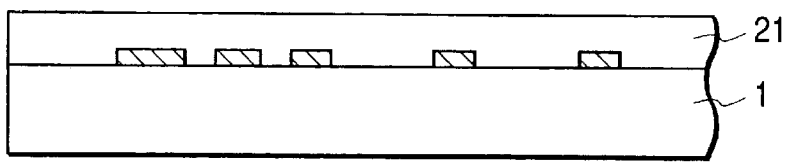
Figure 2C:
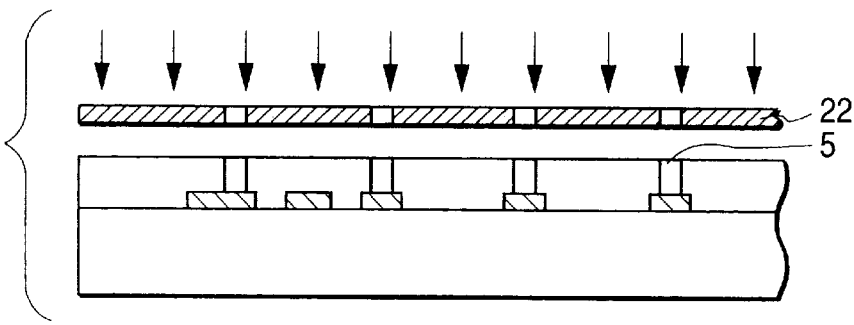
Figure 2D:
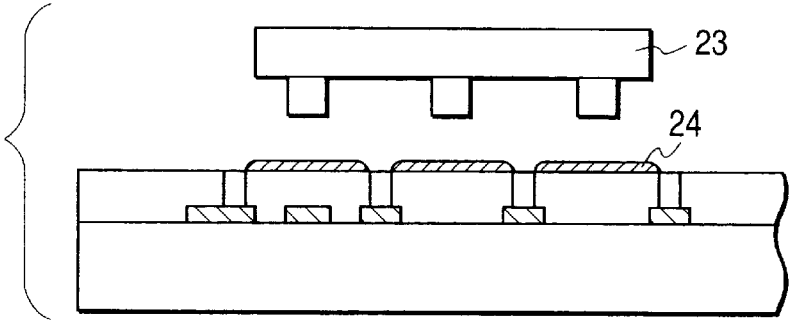
Figure 2E:
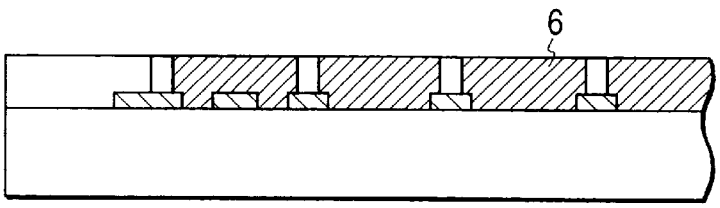
Figure 2F:
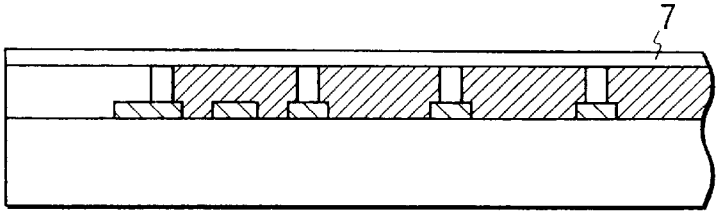

As shown in FIG. 2C, each non-colored portion 5 is formed on the black matrix 2 to be narrower than the black matrix 2 in order to prevent color omission.

Step-d

A predetermined color pattern is drawn by applying R, G, and B coloring inks 24 using an ink-jet head 23 to predetermined positions between the non-colored portions of the ink receptive layer 21. At this time, the alignment mark 3 is used for drawing alignment of the ink-jet head 23 and the non-colored portions.

In the present invention, since the alignment mark 3 used for drawing alignment is formed in the effective display region of the black matrix 2, the distance from the alignment mark to the drawing position is short, and drawing alignment is almost free from distortion at the edge of the substrate. Therefore, the drawing shift can be minimized, and no margin for forming the alignment mark need be prepared in a region outside the black matrix 2. Since the alignment mark 3 of the present invention is formed at the same time as the black matrix 2, it is not influenced by the positional shift between the substrate 1 and the black matrix 2.

As the ink-jet system used in the present invention, a bubble-jet type device using an electrothermal converter as an energy generating element, a piezoelectric jet type device using a piezoelectric element, or the like can be used. A coloring area and coloring pattern can be arbitrarily set.

The coloring ink 24 used in the present invention is not limited to an ink which contains a dye and is liquified at the room temperature, but may also be an ink which is solidified at room temperature or lower, and an ink which is softened or liquefied at room temperature. In the ink-jet system, since the temperature of the ink itself is generally adjusted within the range of 30° C. to 70° C. so as to make the ink viscosity fall within the stable discharge range, any ink which is liquified within the above temperature range can be preferably used.

Figure 12:
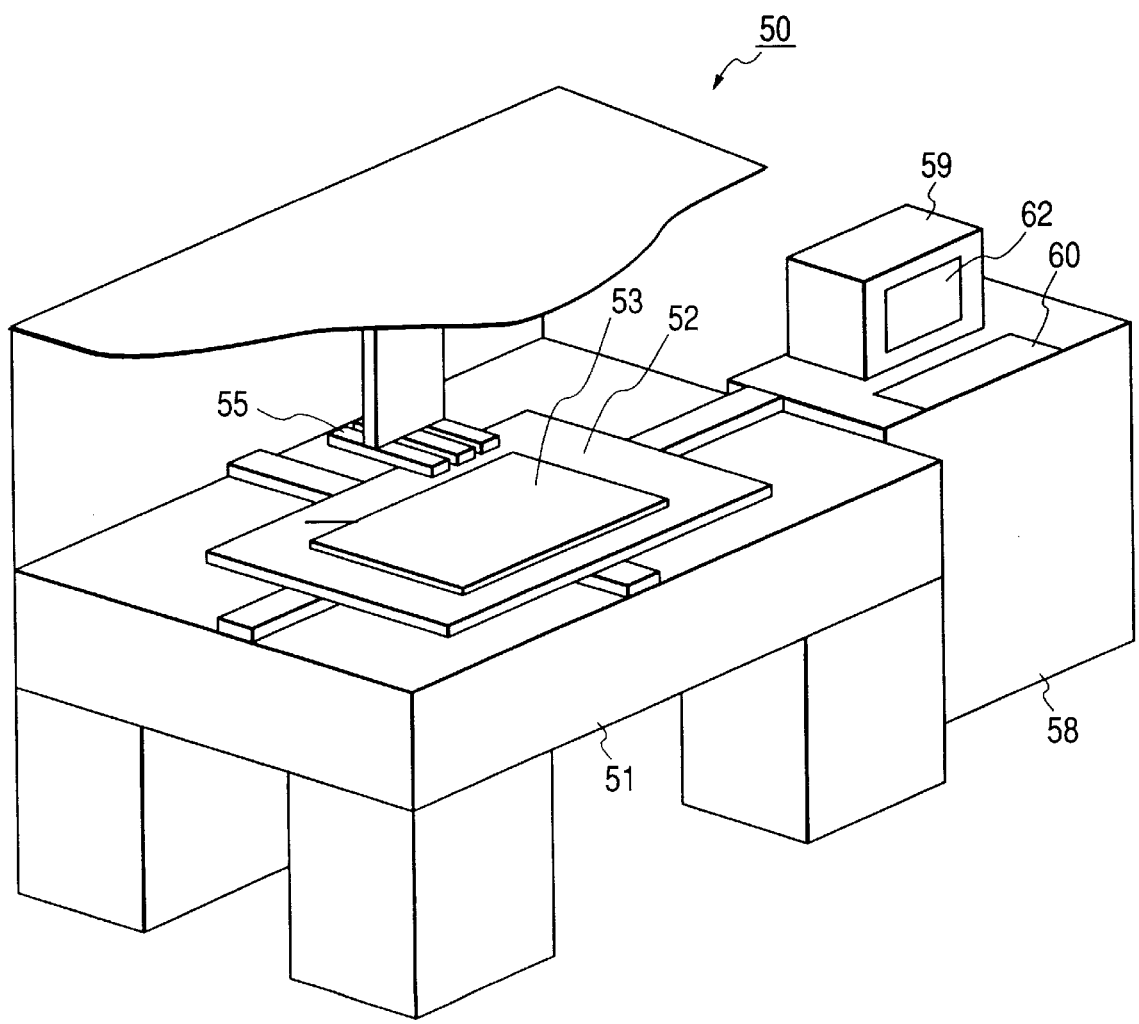
FIG. 12 is a schematic view showing an example of a color filter manufacturing apparatus used in the present invention.

FIG. 12 is a schematic view showing an example of a color filter manufacturing apparatus using the ink-jet system. In FIG. 12, a manufacturing apparatus 50 comprises an apparatus base 51, an X-Y-θ stage 52 disposed on the apparatus base 51, a support substrate 53 set on the X-Y-θ stage 52, an ink-jet head 55, a controller 58 for controlling the overall operation of this apparatus, a teaching pendant (personal computer) 59 serving as the input/output means of the controller, a keyboard 60 as the operation unit of the teaching pendant 59, and a display 62 for displaying information about the manufacturing progress, the presence/absence of an ink-jet head abnormality, and the like. Note that a black matrix and an ink receptive layer are formed on the support substrate 53 but are not illustrated in FIG. 12 for the sake of simplicity.

Figure 13:
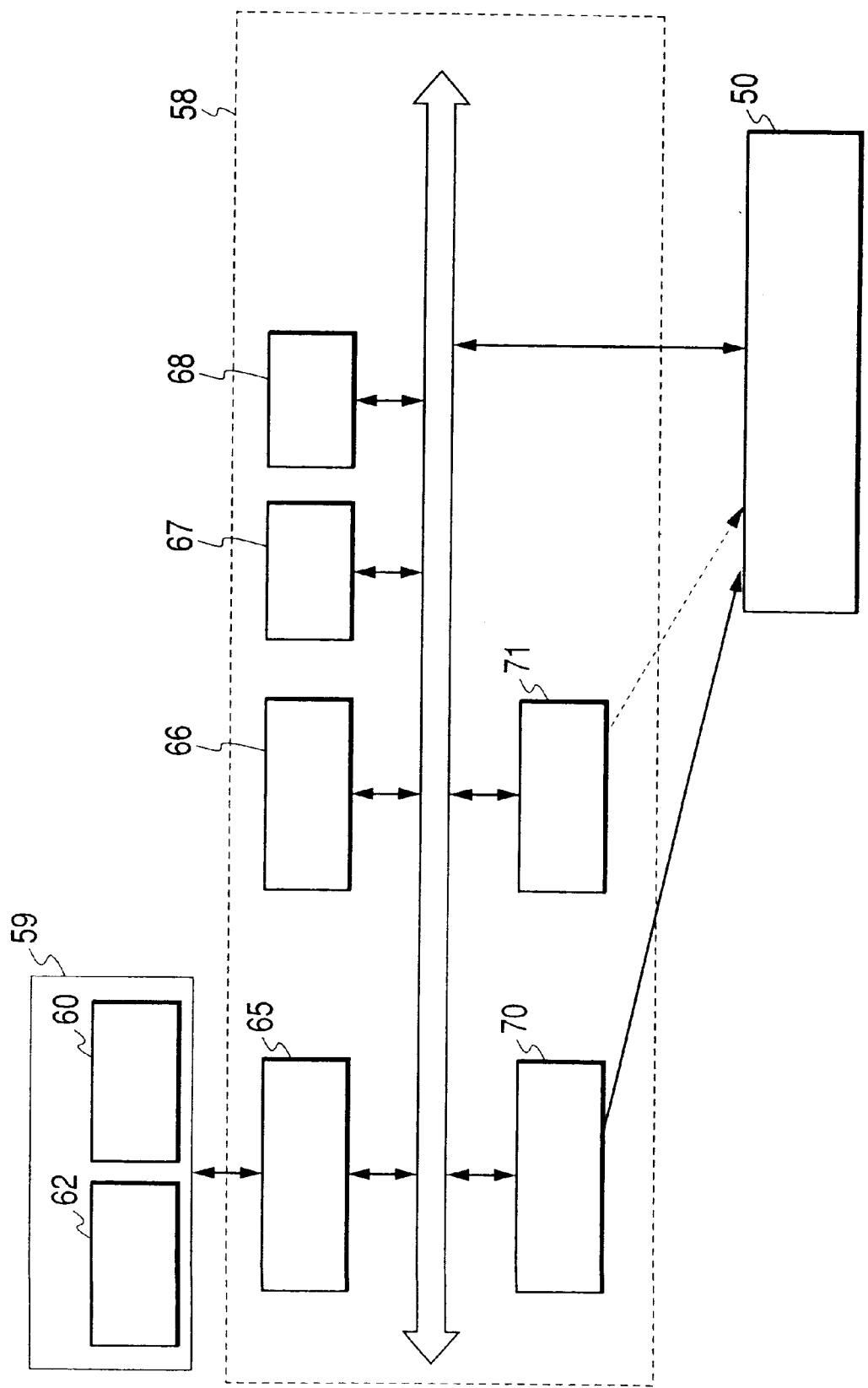
FIG. 13 is a block diagram showing the controller of the manufacturing apparatus shown in FIG. 12.

FIG. 13 is a block diagram showing the arrangement of the controller 58 of the manufacturing apparatus in FIG. 12. In FIG. 13, the controller 58 comprises an interface 65 for exchanging data between the teaching pendant 59 and the controller 58, a CPU 66 for controlling the color filter manufacturing apparatus 50, a ROM 67 storing control programs for operating the CPU 66, a RAM 68 for storing abnormality information and the like, an ink-jet control unit 70 for controlling application of a coloring ink from the ink-jet head 55 to the support substrate 53, and a stage control unit 71 for controlling the operation of the X-Y-θ stage 52 of the color filter manufacturing apparatus 50.

Step-e

The entire ink receptive layer having the colored portions 6 is cured by a proper process such as light irradiation or heating.

Step-f

If necessary, a protective layer 7 is formed on the color filter. As the protective layer 7, a photosetting layer, a thermosetting layer, a resin composition layer of thermosetting and photosetting types, or an inorganic film formed by, e.g., deposition or sputtering is available. Any layer can be used so long as the layer can be resistant to the subsequent processes such as an ITO formation process and an aligning film formation process without impairing the transparency of the color filter.

Figure 3:
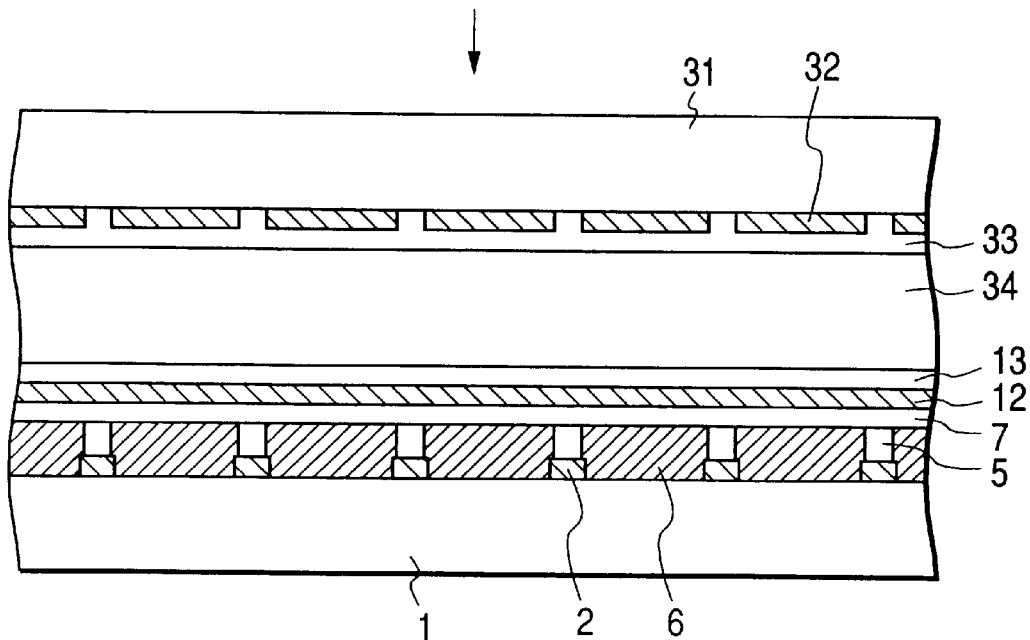
FIG. 3 is a partial sectional view showing an embodiment of a liquid crystal element according to the present invention.

FIG. 3 is a partial sectional view showing an embodiment of a TFT color liquid crystal element incorporating the color filter substrate in FIG. 1. In FIG. 3, the TFT color liquid crystal element is constituted by a common electrode 12, an aligning film 13, a counter substrate 31, pixel electrodes 32, an aligning film 33, and a liquid crystal compound 34.

In general, a color liquid crystal element is formed by joining the color filter substrate to the counter substrate 31 and sealing the liquid crystal compound 34 between them. TFTs (not shown) and the transparent pixel electrodes 32 are formed on the inner surface of one substrate 31 of the liquid crystal element in a matrix. The colored portions 6 of the color filter are placed on the inner surface of the other substrate 1 such that the R, G, and B colorants are positioned to oppose the pixel electrodes 32. The transparent common electrode 12 is formed on the entire surface of the color filter. The aligning films 13 and 33 are formed within the inner surfaces of the two substrates. By rubbing the aligning films 13 and 33, the liquid crystal molecules can be aligned in a predetermined direction. These substrates are arranged to oppose each other via a spacer (not shown), and bonded by a sealing material (not shown). The liquid crystal compound 34 is filled in the gap between these substrates.

Polarizing plates are bonded to the outer surfaces of the respective substrates. As a blacklight, a combination of a fluorescent lamp and a scattering plate is generally used. A display operation is performed by causing the liquid crystal compound to serve as an optical shutter for changing the transmittance for light emitted from the backlight.

The above embodiment has exemplified the TFT color liquid crystal element. However, the present invention is not limited to this, and can also be preferably applied to another drive type liquid crystal element such as a simple matrix type liquid crystal element.

As long as the liquid crystal element of the present invention is constituted by the color filter substrate of the present invention, a conventional technique can be directly used for the remaining members. Therefore, as the liquid crystal compound, a general TN liquid crystal, a general ferroelectric liquid crystal, or the like can be preferably used.

FIGS. 4A to 4D show another embodiment of the color filter substrate manufacturing method according to the present invention. Also in this case, an alignment mark having a pattern shown in FIG. 1A is formed. FIGS. 4A to 4D are schematic sectional views corresponding to the following step-a to step-d, respectively.

Step-a

A black matrix 2 also serving as partition walls is formed on a substrate 1. In this embodiment, the black matrix 2 is used as not only a light-shielding layer but also a member for preventing mixing of adjacent inks in different colors upon applying curable coloring inks (to be described later). In the present invention, an alignment mark 3 is formed at the same time as the black matrix 2.

The black matrix 2 is preferably made of a resin. For example, the black matrix 2 is formed using a black-pigment-containing resist by patterning such as general photolithography. To avoid mixing of different color inks, the black matrix 2 preferably has ink repellency. In the present invention, the black matrix 2 desirably has a thickness of not greater than 10 μm, desirably 0.5 μm to 5.0 μm, in consideration of the partition function and the light-shielding function.

Step-b

R, G, and B curable coloring inks 41 are applied using an ink-jet head 23 so as to fill the opening portions of the black matrix 2. Similar to the embodiment shown in FIGS. 2A to 2F, the alignment mark 3 is used for drawing alignment of the ink-jet head 23 and the opening portions of the black matrix 2. The use effects of the alignment mark 3 have been described above.

The curable coloring ink used in the present invention is made of a curable resin composition and contains at least a colorant and a resin which can be cured by application of energy.

As the colorant, a dye is preferably used. For example, a direct dye, an acid dye, a reactive dye, a disperse dye, and an oil-soluble dye are available. However, the colorant is not limited to them.

As the resin which can be cured by application of energy, a resin which can be cured by heat, light, or a combination of them is preferably used. More specifically, as a thermosetting compound, a combination of a known resin and a crosslinker can be used. Examples of such a resin are a melamine resin, a combination of a hydroxyl- or carboxyl-group-containing polymer and melamine, a combination of a hydroxyl- or carboxyl-group-containing polymer and a polyfunctional epoxy compound, a combination of a hydroxyl- or carboxyl-group-containing polymer and a cellulose reactive compound, a combination of an epoxy resin and a resol resin, a combination of an epoxy resin and amines, a combination of an epoxy resin and a carboxylic acid or acid anhydride, and an epoxy compound.

As the photosetting compound, a known photosetting resin such as a commercially available negative resist can be preferably used.

The compound may be cured by not only heat or light but also a combination of them.

Various solvents can be used for the curable ink. Particularly in the ink-jet system, a solvent mixture of water and a water-soluble organic solvent is preferably used in terms of a discharge operation.

To attain desired characteristics in addition to the above components, as needed, a surfactant, an anti-foam agent, an antiseptic agent, or the like can be added. Further, a commercially available water-soluble dye or the like can also be added.

Solvents other than water and a water-soluble organic solvent can be used for a photosetting or thermosetting resin which does not dissolve in water or a water-soluble organic solvent but can be stably discharged. For a curable compound which can be optically polymerized, a solvent-free material prepared by dissolving a dye in a monomer can be used.

Step-c

If necessary, processes such as drying, light irradiation, and heating are performed to cure the coloring ink and form colored portions 42.

Step-d

Similar to step-f in the above-mentioned embodiment, a protective film 7 is formed on the color filter, as needed.

Figure 5:
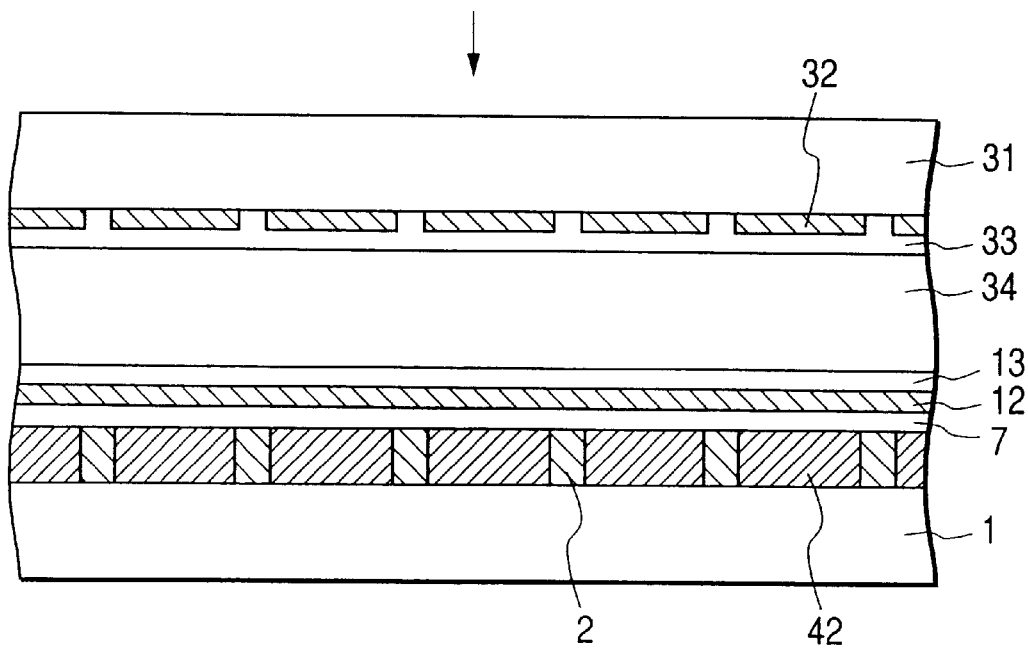
FIG. 5 is a partial sectional view showing another embodiment of the liquid crystal element according to the present invention.
Figure 4A:
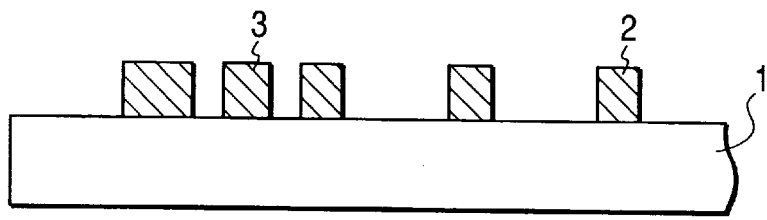
FIGS. 4A, 4B, 4C and 4D are sectional views, respectively, showing another embodiment of the color filter substrate manufacturing method according to the present invention.
Figure 4B:
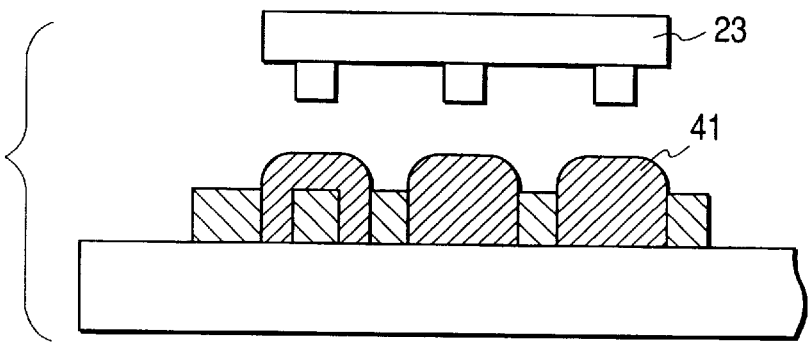
Figure 4C:
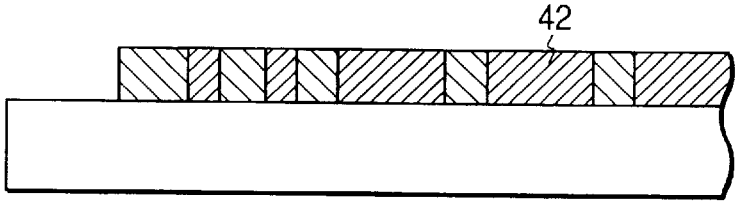
Figure 4D:
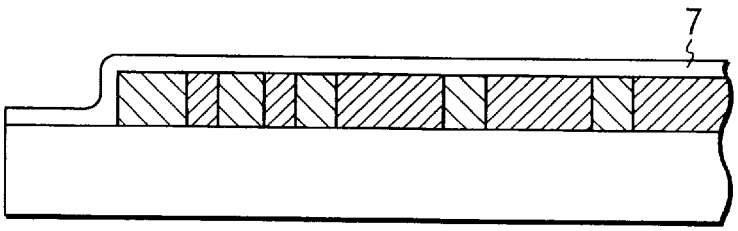

The color filter substrate formed in this embodiment can also constitute a liquid crystal element shown in FIG. 3. FIG. 5 shows an example of the liquid crystal element. The same reference numerals as in FIG. 3 denote the same parts, and a description thereof will be omitted.

In addition to the use of alignment marks, alignment can be achieved by recognizing, by means of image processing, that the continuous opening portion pattern ends at the end portion of the black matrix 2 with respect to the continuous pattern of the opening portion 4 in the effective display region of the black matrix 2.

EXAMPLE 1

A 0.2-μm thick chromium film was formed on a surface-polished non-alkali glass substrate by sputtering, and patterned by photolithography into a black matrix having opening portions in correspondence with pixels. Two alignment marks were formed in an opening portion at the corner of the effective display region as shown in FIGS. 1A and 1B and a position symmetrical with this opening portion with respect to the vertical axis. The black matrix was spin-coated with a material prepared by mixing 3 parts by weight of triphenylsulfonium hexafluoroantimonate in 97 parts by weight of acrylic copolymer containing 3 parts by weight of acrylic acid, 49 parts by weight of methyl methacrylate, 29 parts by weight of hydroxyethyl methacrylate, and 19 parts by weight of N-methylolacrylamide, mixing 17 parts by weight of y-glycidoxypropyltrimetoxysilane in 83 parts by weight of the obtained mixture, and adding 85 parts by weight of ethyl cellosolve in 15 parts by weight of the resultant mixture. The obtained structure was dried at 50° C. for 10 min to form a 1-μm thick photosensitive resin layer (ink receptive layer).

The ink receptive layer was exposed via a photomask having opening portions narrower than the width of the black matrix, and the resultant structure was heated by a hot plate at 120° C. for 90 sec.

The alignment marks were image-sensed by a CCD camera. The obtained image was processed by an image processing apparatus to detect the positions of the alignment marks, and the ink-jet head was aligned with the glass substrate.

Then, the ink receptive layer was colored by applying R, G, B inks each having the following composition from the ink-jet head to unexposed portions of the ink receptive layer.

| <R ink> | |
|---|---|
| C.I. Acid Red 118: | 5 parts by weight |
| ethylene glycol: | 20 parts by weight |
| isopropyl alcohol: | 5 parts by weight |
| water: | 70 parts by weight |
| <G ink> | |
| C.I. Acid Green 25: | 5 parts by weight |
| ethylene glycol: | 20 parts by weight |
| isopropyl alcohol: | 5 parts by weight |
| water: | 70 parts by weight |
| <B ink> | |
| C.I. Acid Blue 113: | 5 parts by weight |
| ethylene glycol: | 20 parts by weight |
| isopropyl alcohol: | 5 parts by weight |
| water: | 70 parts by weight |

The ink receptive layer was cured by drying at 90° C. for 10 min and heating at 230° C. for 30 min. A protective film was formed by applying, by spin coating, a 1-μm thick two-part thermosetting resin composition (mixture of "OPTOMER SS6500" and "OPTOMER SS0500", at 79:21, available from Japan Synthetic Rubber Co., Ltd) containing 85% of Carbitol acetate, and curing the resin composition film by drying at 90° C. for 20 min and heating at 230° C. for 60 min.

According to this method, since the distance from the alignment mark to the drawing position is short, and drawing alignment is almost free from distortion at the edge of the substrate, the drawing shift can be minimized, and generation of color filter defects caused by the drawing shift can be prevented.

The manufactured color filter substrate for a liquid crystal element was observed with an optical microscope to find that defects such as color mixing and white omission were greatly reduced.

An ITO film was sputtered by an in-line sputtering apparatus using a mask to constitute a liquid crystal element by a general means, thereby obtaining a high-precision color image display.

EXAMPLE 2

A color filter substrate was manufactured by the same procedure as in Example 1 except that an alignment mark was prepared by recessing the side wall of an opening portion. The manufactured color filter substrate for a liquid crystal element was observed with an optical microscope to find no defects such as color mixing and color omission.

COMPARATIVE EXAMPLE 1

A color filter substrate was manufactured by the same procedure as in Example 1 except that the ink-jet head was aligned using an alignment mark formed outside the effective display region.

The probability of generation of color mixing and color omission was lower, and the manufacturing yield of the color filter substrate was higher in the color filter substrates in Examples 1 and 2 in which the ink-jet head was aligned with reference to the alignment mark formed in the effective display region, than in the color filter substrate in Comparative Example 1 in which the ink-jet head was aligned with reference to the alignment mark formed outside the effective display region.

EXAMPLE 3

A glass substrate was coated with a black pigment resist CK-S171B available from Fuji Hanto to a thickness of 1.0 μm by spin coating. The resist film was exposed, developed, and heat-treated to form a 1.0-μm thick black matrix. A total of two alignment marks were formed in the opening portion at the corner in the effective display region as shown in FIGS. 1A and 1B and a position symmetrical about this opening portion with respect to the vertical axis.

The alignment mark images were sensed by a CCD camera and processed by an image processing apparatus to detect the positions of the alignment marks, thereby positioning an ink-jet head and the glass substrate. R, G, and B inks were injected into the openings using an ink-jet printer. The following inks were used.

| <R ink> | |
| --- | --- |
| C.I. Acid Red 118: | 5 parts by weight |
| glycerol polyglycidyl ether [Denacol EX-313 available from Nagase Kasei Kogyo KK]: | 1.5 parts by weight |
| terpolymer of acrylic acid, methyl methacrylate, and hydroxyethyl methacrylate: | 3 parts by weight |
| N-methyl-2-pyrrolidone: | 15 parts by weight |
| ethylene glycol: | 20 parts by weight |
| ethanol: | 2 parts by weight |
| ion exchange water: | 53.5 parts by weight |
| <G ink> | |
| C.I. Acid Green 25: | 5 parts by weight |
| glycerol polyglycidyl ether [Denacol EX-313 available from Nagase Kasei Kogyo KK]: | 1.5 parts by weight |
| terpolymer of acrylic acid, methyl methacrylate, and hydroxyethyl methacrylate: | 3 parts by weight |
| N-methyl-2-pyrrolidone: | 15 parts by weight |
| ethylene glycol: | 20 parts by weight |
| ethanol: | 2 parts by weight |
| ion exchange water: | 53.5 parts by weight |
| <B ink> | |
| C.I. Acid Blue 113: | 5 parts by weight |
| glycerol polyglycidyl ether [Denacol EX-313 available from Nagase Kasei Kogyo KK]: | 1.5 parts by weight |
| terpolymer of acrylic acid, methyl | 3 parts by weight |

-continued

| | |
| --- | --- |
| methacrylate, and hydroxyethyl methacrylate: | |
| N-methyl-2-pyrrolidone: | 15 parts by weight |
| ethylene glycol: | 20 parts by weight |
| ethanol: | 2 parts by weight |
| ion exchange water: | 53.5 parts by weight |

After the above inks were injected, the inks were cured at 230° C. for 40 min to form a liquid crystal element color filter. The resultant color filter was observed with an optical microscope to find that defects such as color mixing and white omission were greatly reduced.

A protective film was formed by applying, by spin coating, a 1-μm thick two-part thermosetting resin material ("OPTOMER SS6500" available from Japan Synthetic Rubber Co., Ltd) and curing the resin film by heating at 230° C. for 30 min. A series of operations such as ITO (electrode) formation, aligning film formation, and liquid crystal material sealing were sequentially performed to manufacture an excellent color liquid crystal element shown in FIG. 5.

As has been described above, according to the present invention, since drawing alignment can be performed with high precision in manufacturing a color filter substrate, color omission and color mixing of the color filter caused by a drawing shift can be prevented, and a high-reliability color filter substrate can be provided. In the present invention, since no margin is required to form an alignment mark outside the black matrix, the substrate can be effectively used. Therefore, a liquid crystal element excellent in color display characteristics can be constituted using the color filter substrate of the present invention.

What is claimed is:

1. A color filter substrate manufacturing method comprising the steps of:

forming a black matrix having a plurality of first apertures of the same shape on a support substrate;

forming a color filter by an ink-jet system; and forming an alignment mark within an effective display region, with the alignment mark having a second aperture different in shape from the plurality of first apertures of the black matrix, and alignment is performed using the alignment mark in forming the color filter.

2. A method according to claim 1, wherein the alignment mark is formed using the same material as that of the black matrix.

3. A method according to claim 1, wherein the alignment mark is one of a projection and a recess formed on a side wall of an opening portion of the black matrix.

4. A method according to claim 1, wherein the alignment mark is a display region in the black matrix.

5. A method according to claim 1, further comprising the step of forming an ink receptive layer on the support substrate and the black matrix and applying an ink to the ink receptive layer by an ink-jet scheme to form a color filter after the step of forming the black matrix.

6. A method according to claim 1, further comprising the step of forming a color filter by applying an ink to an opening portion of the black matrix by an ink-jet scheme.

7. A color filter substrate manufactured by the method of any one of claims 1, 5, and 6.

8. A liquid crystal element comprising a counter substrate opposing the color filter substrate manufactured by any one of claims 1, 5, and 6, and a liquid crystal compound sealed between the color filter substrate and the counter substrate.

* * * * *